United States Patent [19]

Nakazawa

[11] Patent Number: 4,630,071
[45] Date of Patent: Dec. 16, 1986

[54] XY RECORDER

[75] Inventor: Yoshio Nakazawa, Fujisawa, Japan

[73] Assignee: Graphtec Kabushiki Kaisha, Fujisawa, Japan

[21] Appl. No.: 795,470

[22] Filed: Nov. 5, 1985

[30] Foreign Application Priority Data

Jan. 30, 1985 [JP] Japan .................................. 60-15697

[51] Int. Cl.⁴ ........................................... G01D 15/28
[52] U.S. Cl. ....................................... 346/136; 226/8; 226/182; 242/182; 346/112
[58] Field of Search ................. 346/136, 134, 112, 29; 242/180–185; 226/8, 162, 182

[56] References Cited

U.S. PATENT DOCUMENTS 4,131,224 12/1978 Gerber ............................ 346/136 X
4,216,482 8/1980 Mason ............................. 346/134 X
4,477,822 10/1984 Luoma ................................ 346/136

Primary Examiner—Joseph W. Hartary
Attorney, Agent, or Firm—Spensley Horn Jubas & Lubitz

[57] ABSTRACT

An XY recorder in which a recording paper is moved on a platen along the X axis in accordance with one variable and a stylus is moved along the Y axis in accordance with another variable, employs a controller to control the paper movement in several different modes. In a paper draw out mode, the paper is drawn out from a paper-feed roll pinched on the platen between pinch rollers and drive rollers, and during a time interval when the paper-feed roll exerts a backward tension to the paper, the paper is intermittently allowed to slip on the platen by disengaging the pinch rollers from the drive rollers. The tension to the paper backward from the paper-feed roll automatically aligns the paper.

4 Claims, 10 Drawing Figures

XY RECORDER

BACKGROUND OF THE INVENTION

This invention relates to an XY recorder, in which recording paper is moved in the X direction in accordance with one variable, and a stylus is moved across the paper in the orthogonal Y direction in accordance with another variable.

Many types of such XY recorders use paper perforated along its edge (or edges). The paper is moved with a sprocket wheel (or wheels) engaged to the perforations. For such perforated paper, a paper alignment is satisfactory, because the perforations on a paper edge (or edges) are aligned to paper. But perforated paper is expensive.

Some types of such XY recorders use ordinary paper without perforations. But heretofore known XY recorders using non-perforated paper either have problems on paper alignment or have such an elaborate mechanism as disclosed by a U.S. Pat. No. 4,216,482 invented by Martin K. Mason.

BRIEF DESCRIPTION OF THE INVENTION

In the present invention, recording paper is drawn out from a paper-feed roll and is moved on a platen pinched between drive rollers and pinch rollers. The movement of the paper is controlled by a controller in several different modes. In a paper draw out mode, a length of paper corresponding to a predetermined number of recording sections (for example, one recording section or two recording sections) is drawn out from the paper-feed roll. In this paper draw out mode, and in a condition in which the paper-feed roll exerts a backward tension to the paper, a paper alignment mode is inserted. In the paper alignment mode, the engagement of the pinch rollers to the drive rollers is intermittently released to allow the paper slip on the platen. The backward tension of the paper-feed roll automatically aligns the paper.

And, in this paper draw out mode, when the controller is preset to draw out more than two recording sections of the paper, a sag forming mode is inserted after the paper draw out mode. When a sag forming mode is commenced, the direction of the rotation of the drive rollers is reversed, and the paper moves in a backward direction. Since the paper-feed roll is rotated by a tension from the paper, the rotation of the paper-feed roll stops and the length of the paper moved backward from the platen to the paper-feed roll forms a sag on the side of the paper-feed roll.

This sag is of help to stabilize the recording paper, especially when the recording paper is in a following condition. Recording paper newly drawn out from a paper-feed roll which is usually isolated from the surrounding atmosphere may have humidity different from the atmosphere. If a figure is recorded on recording paper in this condition, the paper may later expand or contract under the atmospheric humidity to cause a distorsion of the recorded figure. The portion of the drawn out paper which is in the sag and waiting for recording is left in the atmosphere to be naturally stabilized.

After the paper draw out mode, an original point for the next recording section is determined, and a recording mode is commenced.

In a recording mode, the paper is moved along the X axis in accordance with one variable, and the stylus is moved along the Y axis in accordance with another variable. Lines are recorded on loci of points determined by positions of the stylus relative to the paper.

PREFERRED EMBODIMENT

Figure 1:
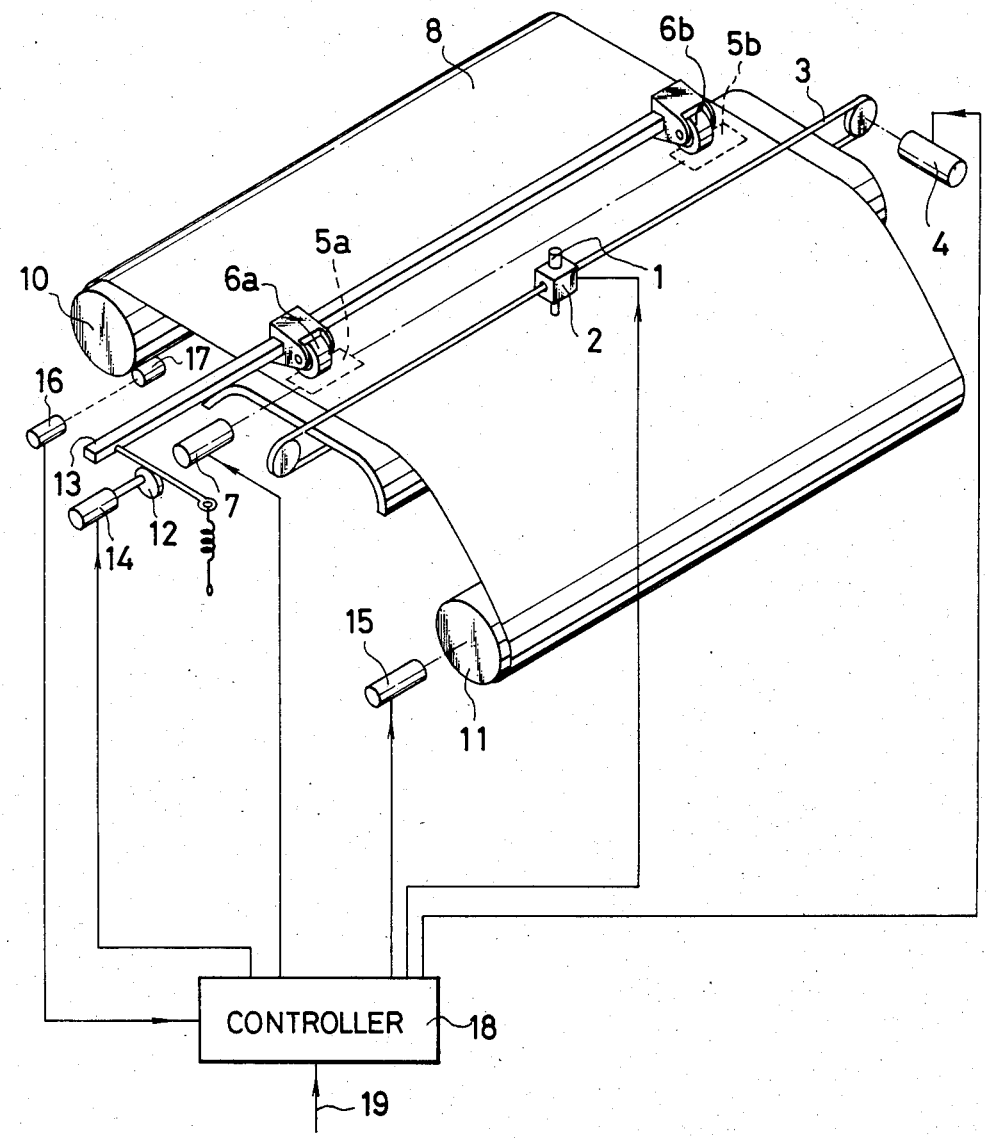
FIG. 1 is a schematic perspective view of an embodiment of this invention.
Figure 2:
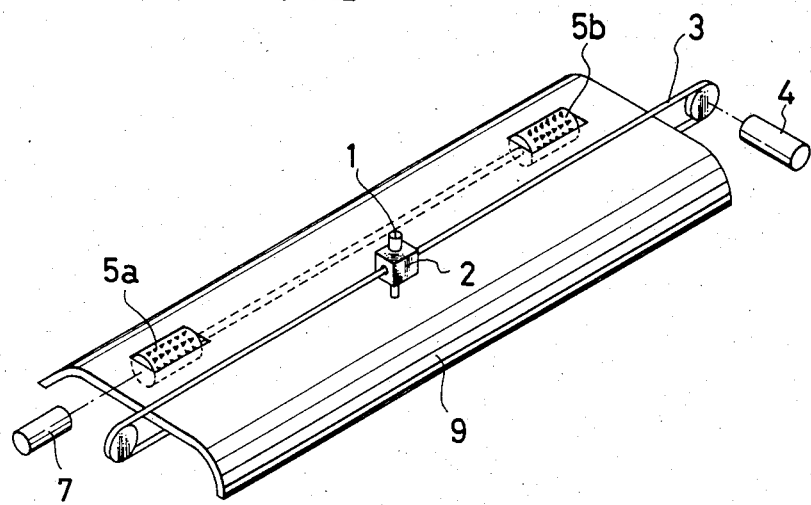
FIG. 2 shows a portion of a structure of FIG. 1, revealing surfaces of drive rollers.

Referring now to FIG. 1, a recording stylus 1 is mounted on a carriage 2 which is moved along a line parallel to the Y axis of the recorder by a belt 3. A step motor 4 drives the belt 3 through a drive pulley to control the position of the stylus 1. Drive rollers 5a and 5b are affixed to the shaft of a step motor 7. As shown in FIG. 2, these drive rollers 5a and 5b are situated under a platen 9, and rectangular openings are provided in the platen 9 through which the circular surfaces of these drive rollers touch the back surface of recording paper 8. Pinch rollers 6a and 6b are engaged to the drive rollers 5a and 5b respectively to pinch the paper 8. The paper is moved along a line parallel to the X axis of the recorder by an amount determined by a rotational angle of the drive rollers 5a and 5b as long as the paper 8 is pinched between the drive rollers and the pinch rollers.

The recording paper 8 is drawn out from a paper-feed roll 10, which is rotated by a force exerted from a forward moving paper. Recorded sections of the paper 8 is coiled by a paper-coil roll 11, which is rotated by a paper-coil roll drive motor 15. A cam drive motor 14 drives a cam 12, which turns a shaft 13 to which pinch rollers 6a and 6b are affixed. When the shaft 13 is turned by the cam 12, the pinch rollers 6a and 6b are intermittently disengaged from the drive rollers 5a and 5b to allow the paper 8 slip on the platen 9. A shaft encoder 16 is affixed to the shaft of a detector roll 17 which is rotated in contact with the surface of the paper-feed roll 10.

A controller 18 receives control commands 19 from a control computer (not shown in the drawing) and the output signal from the shaft encoder 16, and delivers motor control signals to the step motor 4, the step motor 7, the paper-coil roll drive motor 15, and up-down command signal to the stylus 1.

Figure 4:
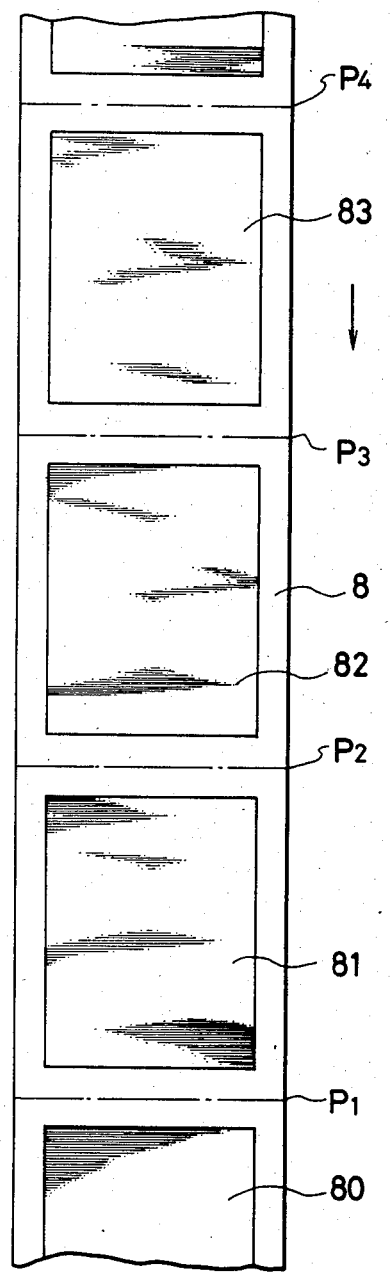
FIG. 4 shows a plan view of several recording sections of recording paper.

Referring now to FIG. 4, $P_1$, $P_2$, $P_3$, $P_4$ are boundary lines of sections 80, 81, 82, 83 of the paper 8. Each one section of the paper 8 is used as an independent XY recording sheet, and each one section is recorded one after another. After recording on a section is completed, that section may be separated along the boundary line. In another embodiment of this invention, the paper-coil roll 11 is not provided, and a recorded section of the paper 8 is separated by a suitable instrument.

In the controller 18, a controlled position of the stylus 1 along the Y axis is determined by an integrated amount of input pulses to the step motor 4, and a controlled position of the paper 8 along the X axis is determined by an integrated amount of input pulses to the step motor 7 which drives the drive rollers 5a and 5b as long as the pinch rollers 6a and 6b are engaged to the drive rollers. If the pinch rollers 6a and 6b are disengaged from the drive rollers 5a and 5b, the shaft encoder 16 affixed to the shaft of the detector roll 17, transmits information of the position of the paper 8 along the X axis. A reference position of the stylus 1 along the Y axis and a reference position of the paper 8 along the X axis are determined by operations in the controller 18 from the commands 19 and other informations available in the controller 18. Thus, the controller controls pulse input to the step motors 4 and 7 in accordance with the errors between the reference positions and controlled positions.

Figure 5A:
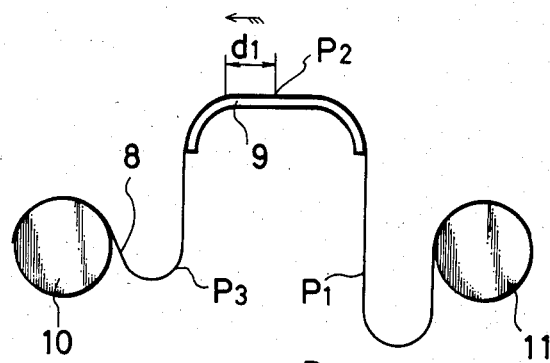
FIG. 5A-F are a series of diagrams illustrating several modes of paper movements in this invention.

This invention is characterized in that the controller 18 controls the paper movement in several different modes. FIG. 5 shows, in a series of diagrams from FIG. 5A to FIG. 5E, an embodiment of this invention in which two recording sections of the paper 8 are drawn out in one cycle of the paper draw out mode, and consequently, a sag forming mode is inserted after the paper draw out mode. Referring to FIG. 5A, the picture shows a state in which the recording on the section 81 (refer to FIG. 4) is completed, and the line $P_2$ is brought under the stylus 1. After the paper 8 is moved backward from the position shown by FIG. 5A by a predetermined amount $d_1$, the paper-coil roll drive motor 15 is actuated and a paper coil mode begins. In this paper coil mode, the drive rollers 5a and 5b drive the paper 8 in the forward direction at a predetermined speed.

Figure 5B:
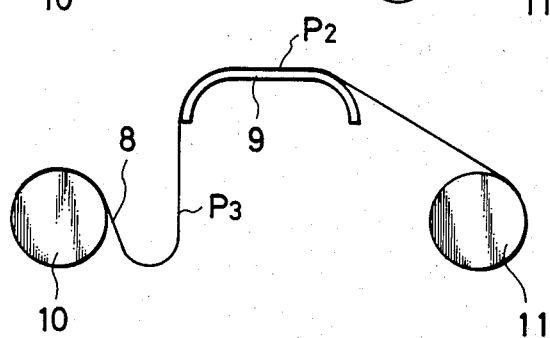

FIG. 5B shows an end of a paper coil mode, in which the line $P_2$ is again brought under the stylus 1, and the portion of the paper 8 between the platen 9 and the paper-coil roll is subjected to a tension from the paper coil roll 11. In this embodiment, the maximum effective torque of the paper-coil roll drive motor 15 is set at a relatively small value, and the paper-feed speed is determined by the rotation of the drive rollers 5a and 5b. More particularly, the rotation of the drive rollers 5a and 5b moves the paper 8 in the forward direction during the paper coil mode, by the amount $d_1$ which has been moved backward before the paper coil mode. And the rotation of the paper-coil roll drive motor 15 is set at a velocity which coils, by the paper-coil roll 11, the surplus portion of the recorded paper between the line $P_2$ and the paper-coil roll 11, during the paper coil mode, and exerts a tension to the paper 8 when the line $P_2$ comes to the original point on the platen 9.

The paper coil mode is terminated in a condition as shown by FIG. 5B, and the paper draw out mode is commenced.

Figure 5C:
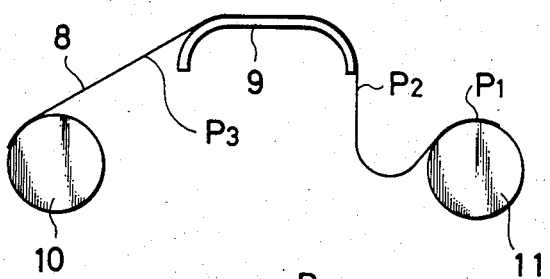
Figure 5D:
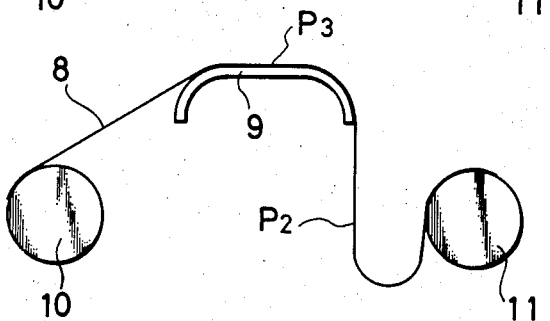

FIG. 5C shows a state of a paper draw out mode in which a tension from the paper-feed roll 10 is exerted to the portion of the paper 8 between the paper-feed roll 10 and the platen 9. FIG. 5D shows another state of the paper draw out mode in which the controller 18 knows the line $P_3$ is under the stylus 1. The position of the line $P_3$ is calculated by the total amount of input pulses to the step motor 7 from the state known by FIG. 5A. From the point shown by FIG. 5D, a paper alignment mode is commenced.

Figure 3:
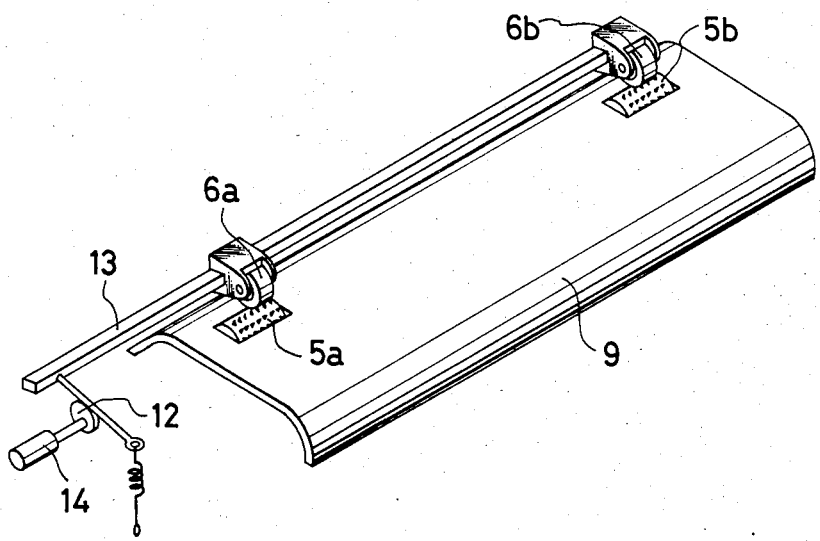
FIG. 3 shows a portion of a structure of FIG. 1 when pinch rollers are disengaged from drive rollers.

In the paper alignment mode, the cam drive motor 14 is energized, and the cam 12 is rotated to turn the shaft 13 back-and-forth. The pinch rollers 6a and 6b are intermittently disengaged (refer to FIG. 3) from the drive rollers 5a and 5b, and during the phase in which the pinch rollers 6a and 6b are disengaged from the drive rollers 5a and 5b, the paper 8 is allowed to slip on the platen 9.

The amount of the paper displacement is determined by the peripheral displacement of the drive roller. Since the peripheral displacement of a drive roller is determined by a product of a rotational angle and the diameter of the roller, and since it is difficult to make the diameters of the two drive rollers 5a and 5b precisely equal to each other, the paper displacement at an edge of the paper, which is driven by the drive roller 5a is different from that at the other edge of the paper, which is driven by the drive roller 5b. This displacement error between the two edges of the paper 8 accumulates as the paper is continuously drawn out, and therefore, this error must be corrected periodically.

At each edge of the paper-feed roll 10, a same length of paper is drawn out by an angle of rotation of the roll. If one edge of the paper is moved further than the opposite edge, the further moved edge experiences a stronger tension from the paper-feed roll 10. This unbalance of tension from the paper-feed roll 10 aligns the paper when the pinch rollers 6a and 6b are disengaged from the drive rollers 5a and 5b to allow the paper 8 slip on the platen 9.

In the paper alignment mode, the number of the input pulses to the step motor 7 does not correspond to the movement of the paper 8 on the platen 9, and the output from the shaft encoder 16 is used to calculate the paper position in the controller 18. After a predetermined length of paper is moved in the paper alignment mode, the paper alignment mode is terminated, and the pinch rollers 6a and 6b are again engaged to the drive rollers 5a and 5b.

Figure 5E:
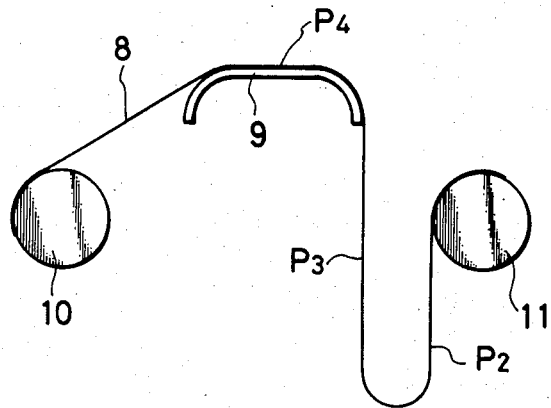

FIG. 5E shows a state of the paper draw out mode succeeding to the paper alignment mode, in which the controller 18 determines by calculation that the line $P_4$ is under the stylus 1. From this state, the rotation of the driving rollers 5a and 5b is reversed and a sag forming mode is commenced. Since the paper-feed roll 10 is rotated by a tension from the paper 8, a sag of the paper 8 is formed on the side of the paper-feed roll 10, as the paper 8 is moved backward on the platen 9.

Figure 5F:
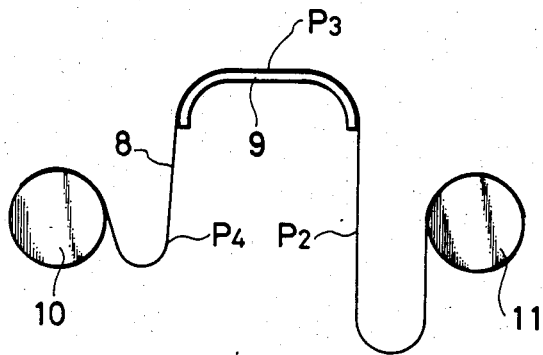

FIG. 5F shows a state of the sag forming mode when the controller 18 determines by calculation that the line $P_3$ is again under the stylus 1. At this state the sag forming mode is terminated and a recording mode is commenced.

In the recording mode, the step motor 7 is controlled by pulses delivered in accordance with a function, and the step motor 4 is controlled by pulses delivered in accordance with another function, and the up-down of the stylus 1 is controlled by the controller 18 to draw figures on a section 82 between lines $P_2$ and $P_3$. After the recording on this section is completed, the line $P_3$ is again brought under the stylus 1 as shown by FIG. 5F.

The state of FIG. 5F corresponds to that of FIG. 5A with the section 82 substituting the section 81. During the time when the section 82 is in a recording mode, the section 83 between lines $P_3$ and $P_4$ is in the sag portion in order to be adapted to the environment and obtain a stabilized humidity condition. In a series of diagrams from FIG. 5A to FIG. 5F, there is shown an embodiment in which at least one recording section, which is to be recorded in the next recording mode, is exposed to the surrounding atmosphere. In other embodiments of this invention, however, the paper movement can be controlled to form a sag portion where a length of the paper 8 containing more than two recording sections is exposed to the surrounding atmosphere, to give the paper in the sag portion an ampler time for humidity stabilization.

I claim:

1. An XY recorder comprising a paper-feed roll, means for moving a recording paper drawn out from said paper-feed roll in an X direction perpendicular to the axis of said paper-feed roll, pinching the, paper on a platen between drive rollers and pinch rollers, means for moving a recording stylus in Y direction which is orthogonal to the X direction, and control means for controlling said means for moving a recording paper and said means for moving a recording stylus, characterized in that;

said control means controls the paper movement in several different modes, including at least a paper draw out mode, a paper alignment mode, and a recording mode, in said paper draw out mode, a length of the recording paper including a predetermined number of recording sections, is drawn out from said paper-feed roll, in said paper alignment mode, the paper is allowed to slip on said platen by a tension from said paper-feed roll when said pinch rollers are intermittently disengaged from said drive rollers, and in said recording mode, the paper movement in a recording section of the paper is controlled in accordance with one function, and the stylus movement is controlled with another function.

2. An XY recorder in accordance with claim 1, in which a shaft encoder is affixed to the shaft of a detector roll which is rotated in contact with the surface of said paper-feed roll to supply an information of the paper movement in said paper alignment mode.

3. An XY recorder in accordance with claim 1, in which said control means controls the paper movement in several different modes including a sag forming mode, and a length of paper containing not less than two recording sections is drawn out in said paper draw out mode, the drawn out paper is moved backward towards said paper-feed roll in said sag forming mode, to form a sag of the paper on the side of the paper-feed roll in order to give a stabilized humidity condition to the sag portion of the paper before said sag portion of the paper is recorded.

4. An XY recorder in accordance with claim 1, in which said control means controls the paper movement in several different modes including a paper coil mode, and in said paper coil mode, the recorded paper is coiled by a paper coil roll.

* * * * *